United States Patent [19]

Schneider

[11] 3,735,030

[45] May 22, 1973

[54] COLOR TELEVISION CAMERA UTILIZING TWO PICKUP TUBES

[75] Inventor: Hans-Dieter Schneider, Gross-Gerau, Germany

[73] Assignee: Fernseh GmbH, Darmstadt, Germany

[22] Filed: July 7, 1971

[21] Appl. No.: 160,279

[30] Foreign Application Priority Data

July 8, 1970 Germany.....................P 20 33 754.6

[52] U.S. Cl. .............................................178/5.4 ST

[51] Int. Cl..................................................H04n 9/08

[58] Field of Search.......................178/5.4 ST, 5.4 R, 178/5.2 R, DIG. 3

[56] References Cited

UNITED STATES PATENTS 3,586,764 6/1971 Diell ...............................178/5.4 ST 3,499,980 3/1970 Smierciak........................178/DIG. 3

FOREIGN PATENTS OR APPLICATIONS 1,041,590 9/1966 Great Britain ..................178/5.4 ST

*Primary Examiner*—Robert L. Richardson
*Attorney*—Carroll B. Quaintance et al.

[57] ABSTRACT

A color television camera comprises two camera tubes and optical means splitting an incident light beam into three partial beams corresponding respectively to three different parts of the visible spectrum, the green or luminance partial beam being supplied to one of the camera tubes and the red and the blue partial beam being supplied to the other camera tube. The red image is mirror inverted with respect to the blue image; the blue image and the red image are both scanned by one electron beam of said other tube.

7 Claims, 5 Drawing Figures

Inventor:
HANS-DIETER SCHNEIDER

Littlepage Quaintance Wray and Aisenberg

Inventor:
HANS-DIETER SCHNEIDER
Littlepage Quaintance Wray
and Aisenberg

COLOR TELEVISION CAMERA UTILIZING TWO PICKUP TUBES

BACKGROUND OF THE INVENTION

Color television cameras generally include a plurality of camera tubes, on the photo-electric cathodes, of which the image of the object to be transmitted is formed in different spectral regions. Splitting of the incident light beam from the object is effected by means of dichroitic coatings disposed on mirror or prism faces.

SUMMARY OF THE INVENTION

One object of the present invention is to provide an improved color television camera.

According to the present invention there is provided a color television camera comprising two camera tubes, optical means for forming an image in the luminance or green region of the visible spectrum on the face plate of the first of said camera tubes and for forming an image in the red region and an image in the blue region of the visible spectrum on the face plate of the second of said camera tubes, said image in the red region being mirror inverted with respect to said image in the blue region, said images in the red region and in the blue region both being scanned by the same single electron beam of said second camera tube.

Known color television cameras include one, two, or three camera tubes. Color television cameras with three camera tubes have disadvantages concerning size, weight and expenditure.

In connection with color television cameras, several arrangements are known for projecting two or more partial images on the face plate of one camera tube. Some of these known arrangements provide a composite image composed of a plurality of color stripes. These arrangements require stripe filters, the production of which is extremely difficult. Other known arrangements provide projections of several separate images on the face plate of one camera tube. These arrangements have the disadvantage that the geometrical distortions of the individual images differ from each other. In comparison with the known color television cameras, the camera according to the invention offers the advantages that only two camera tubes are used, that a high resolution in the luminance channel is provided, and that the red image and the blue image have similar geometrical distortions. Furthermore, according to the invention, the electron beam of the second camera tube scans the red image and the blue image alternatively line by line or spot by spot.

BRIEF DESCRIPTION OF THE DRAWINGS

A color television camera in accordance with the present invention will now be described by way of example with reference to the accompanying drawings, in which.

DESCRIPTION OF THE PREFERRED EMBODIMENT

Figure 1:
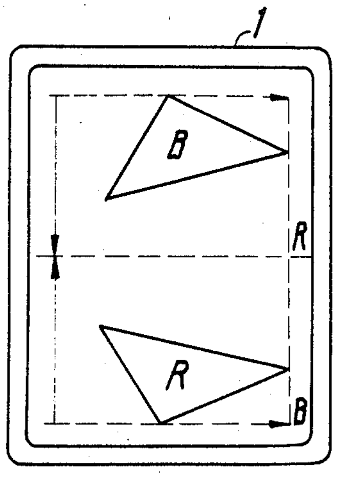
FIG. 1 and FIG. 2 show the arrangement of the images on the face plates of the two camera tubes.

In FIG. 1, the blue and the red image R and B are projected on the photo-sensitive layer 1 of the second camera tube. The images are mirror inverted with respect to each other. Their lower edges for example are situated in direct proximity. Two triangles are illustrated to show this kind of symmetry.

Figure 2:
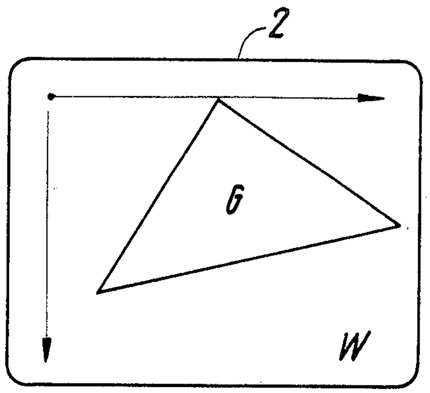

Referring to FIG. 2 the luminance or green image is projected in a larger scale upon the whole second area 2 of the first camera tube.

In both FIGS. 1 and 2 the arrows show the directions of horizontal and vertical scanning.

Figure 3:
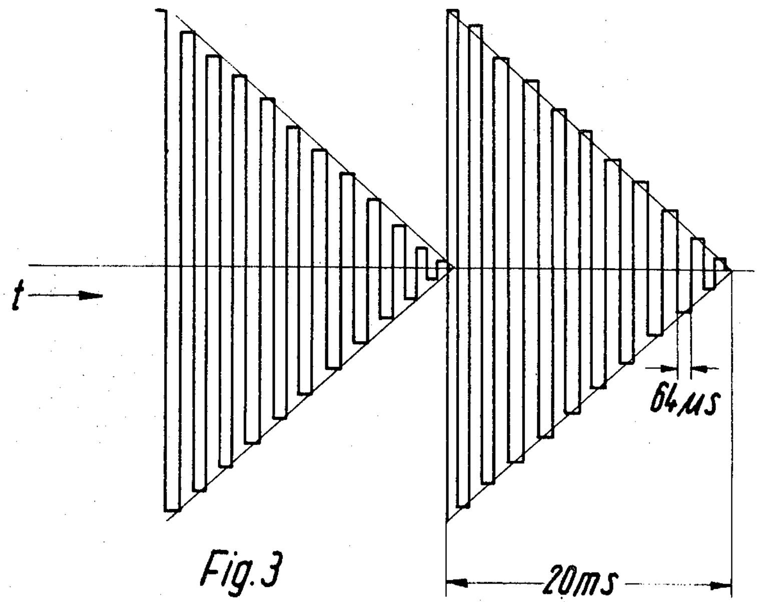
FIG. 3 shows schematic diagrams of the vertical deflection in the case of alternative scanning line by line.

To provide the scanning of both images on the photo-sensitive layer of the second camera tube by one electron beam, the vertical deflection is sequentially switched over from the upper to the lower image line by line. This variation of the vertical deflection is represented by FIG. 3. The deflection shown in the diagram provides, during the first half wave, the scanning of the first line of the upper image. During the second half wave, the first line of the upper image is scanned, etc. Synchronously, the image on the face plate of the first camera tube is scanned in a conventional manner.

For the purpose of reducing the high deflection power, it is possible to apply an electro-static vertical deflection instead of the usually applied magnetic deflection.

Figure 5:
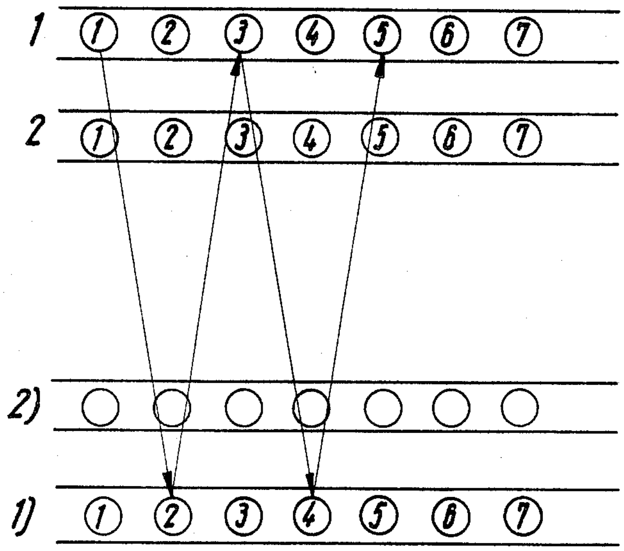
FIG. 5 shows a scanning diagram in the case of point sequential scanning.

An example of point sequential scanning is shown on FIG. 5. The process of the scanning the image spots happens as follows:

The first spot of the first line of the upper image, the second spot of the first line of the low image, the third spot of the first line of the upper image, etc., until the first line is completely scanned. Then the scanning process is continued with the further lines of both images in the same manner.

For transmission of video signals according to present television-broadcast standards, a switch over frequency of about 5 Mc/s is necessary.

When using the scanning system shown in FIG. 5, only half the number of the spots in the image is scanned after the first frame. The remaining spots are scanned during the following frame.

In this manner it is possible to increase the integration time of the individual image spots and the scanned quantity of charge. Therefore, the signal-to-noise-ratio will be increased up to 6 dB. On the other hand the resolution is thus decreased. But this is no disadvantage, because in any case the color signals are transmitted with lower bandwidth.

Figure 4:
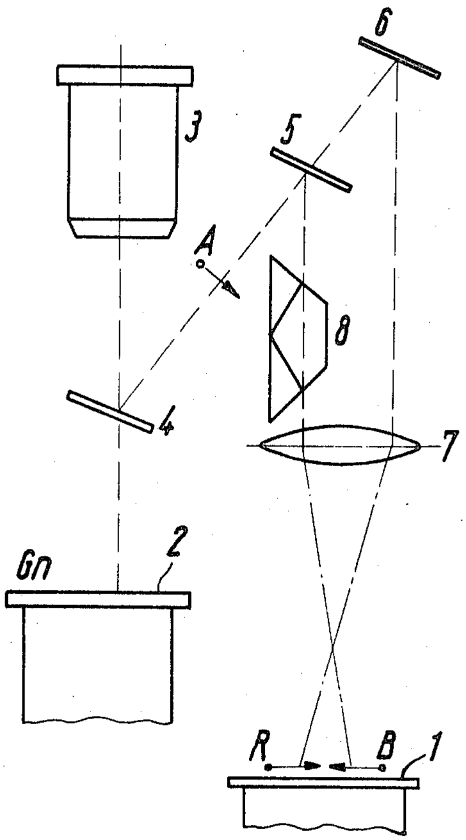
FIG. 4 shows schematically optical means according to the invention.

FIG. 4 shows an optical arrangement for producing the three partial images on the photo-sensitive layers 1 and 2 of two camera tubes. The position of the red and the blue image is indicated by arrows. As shown in FIG. 1, on the photo-sensitive layer 1 there are projected two images, which are mirror inverted with respect to each other, and on the photo-sensitive layer 2 there is projected one image which is about two times larger than the red image or the blue image. This is not required absolutely, but it is suitable in order to use camera tubes of the same type.

The green or luminance part of the incident light is projected by the lens system 3 onto the photo-sensitive layer 2, whereas the red and the blue parts of the light are reflected by the dichroitic mirror 4. On the plane indicated by A, an intermediate image is provided. This intermediate image is projected by the lens system 7 onto the photo-sensitive layer 1 and is split up into the red image R and the blue image B. Therefore a further dichroitic mirror 5, which reflects the blue part of the incident light, and a mirror 6 with total reflection are situated in the beam path between the intermediate image and the lens system 7. A roof prism is arranged in the path of the blue beam to cause the blue image to be mirror inverted with respect to the red one. The roof prism 8 has a coefficient of refraction such that the blue light beam has the same optical path length as the red light beam. Instead of the prism 8, a simple mirror device can be used for image reversing.

Using the spot by spot alternating scanning method, the area of the scanning spot should be a little bit smaller than the area of an image spot to avoid cross talk between the image spots.

I claim

1. A color television camera comprising:

A. two camera tubes, each having a face plate,

B. first optical means for forming an image in a first spectral region of the visible spectrum on the face plate of a first of the two camera tubes, C. second optical means for forming an image in the red region and an image in the blue region of the visible spectrum on separate areas of the face plate of a second of the two camera tubes, the red image being mirror inverted with respect to the blue image, and D. means for scanning both the red image and the blue image with a single electron beam operated in vertical deflection and horizontal deflection, wherein one of the two images on the face plate of the second camera tube is located above, that is to say in the direction of said vertical deflection with respect to the other of the two images on the face plate of the second camera tube, and wherein said means for scanning operates by causing a vertical deflection of the electron beam from a line in one of the two images to a line in the other of the two images at least once between the beginning of scanning of a first line in one of the two images and the beginning of scanning of a second line in said one of the two images, whereby the vertical deflection is used to time-interlace the pickup of segments no longer than line segments from the red image and the blue image by the single electron beam of the second camera tube while the horizontal deflection of the second camera tube operates in a conventional horizontal scan.

2. A camera according to claim 1 wherein the first spectral region is the luminance region.

3. A camera according to claim 1 wherein the first spectral region is the green region.

4. A color television camera according to claim 1, wherein said electron beam completely scans the red image and the blue image alternately line by line.

5. A color television camera according to claim 1 wherein said electron beam scans the red image and the blue image alternately image spot in one line by image spot in a line in the alternate image.

6. A color television camera according to claim 5 wherein said electron beam forms a scanning spot on the face of the second camera tube, and wherein the area of the scanning spot is smaller than the area of one image spot and wherein, during successive frames, one fraction of said image spots after the other are being scanned.

7. A color television camera according to claim 1, wherein said first and second optical means comprise the combination of:

A. a main camera lens system,

B. beam splitting means providing partial first, red, and blue light beams respectively in said first region, in the red region, and in the blue region of the visible spectrum, C. an additional lens system for reducing the size of the red image and the blue image, D. a roof prism situated in the path of one of the blue or red beams, and wherein the optical path respectively of the red beam and the blue beam has the same optical path length as the other of the red and the blue beam.

* * * * *